June 9, 1964 G. H. BLAKER 3,136,850

TELEVISION RECEIVER CABINET

Filed March 30, 1962 2 Sheets-Sheet 1

INVENTOR.
GEORGE H. BLAKER
BY
W. H. Sprague
ATTORNEY

INVENTOR.
GEORGE H. BLAKER
BY
W. H. Sprouagle
ATTORNEY

United States Patent Office 3,136,850

Patented June 9, 1964

3,136,850

TELEVISION RECEIVER CABINET

George H. Blaker, Indianapolis, Ind., assignor to Radio Corporation of America, a corporation of Delaware Filed Mar. 30, 1962, Ser. No. 183,831

6 Claims. (Cl. 178—7.8)

This invention relates to television receiver cabinet construction and particularly to a mounting for supporting the kinescope or picture tube in such a cabinet.

Many present day television receivers use a bi-panel kinescope in which a protective transparent member, such as a filterglass cap, is sealed to the faceplate of the kinescope, thereby eliminating the need for a separate safety glass window in front of the kinescope faceplate and other accouterments such as a dust seal. Such a bi-panel (capped) kinescope is described in a bulletin titled "23BKP4 Bi-Panel Picture Tube" published June 1961 by the Electron Tube Division of Radio Corporation of America, Harrison, New Jersey. Further constructional details of such a kinescope are shown in FIGURE 2 of RCA TN No. 404 published January 1961 by RCA Laboratories of Radio Corporation of America, Princeton, New Jersey.

Such a capped kinescope is provided with projecting lugs at the corners of the cap which were originally intended for mounting the kinescope in a television receiver cabinet. Practical experience has indicated that any mounting using the lugs of the kinescope cap does not provide an entirely satisfactory shock-proof arrangement. Consequently, breakage resulting from handling of the assembled receivers has been considerable.

It, therefore, is an object of the present invention to provide a novel shock-proof mounting by which to support a bi-panel kinescope in a television receiver cabinet.

A mounting in accordance with the present invention utilizes a frame member attached to the cabinet which, in some embodiments, may form the front side of the cabinet. This member has an opening which is bordered by a bezel for framing the kinescope screen. On its rear side, the frame member has, at each corner of the screen, bearing means and anchoring means. Also, the mounting includes clamping means having at least one flange. A part of the clamping means rests firmly on the bearing means and the flange engages the groove formed between the filterglass cap and the kinescope at each corner of the kinescope screen. The clamping means is secured by fastening means cooperating with the anchoring means so that the flange firmly engages the kinescope corner groove, thereby providing a secure shock-proof mounting for the kinescope in the cabinet.

The mounting may also include a plurality of centering members spaced about the periphery of the kinescope on the frame. These members are eccentrically supported so that they can be brought to bear on the kinescope sidewalls by rotary movement and thus properly position the kinescope screen in the frame bezel.

For a better understanding of the invention, reference may be had to the following detailed description of an illustrative embodiment thereof taken in conjunction with the accompanying drawings, of which:

Figure 1:
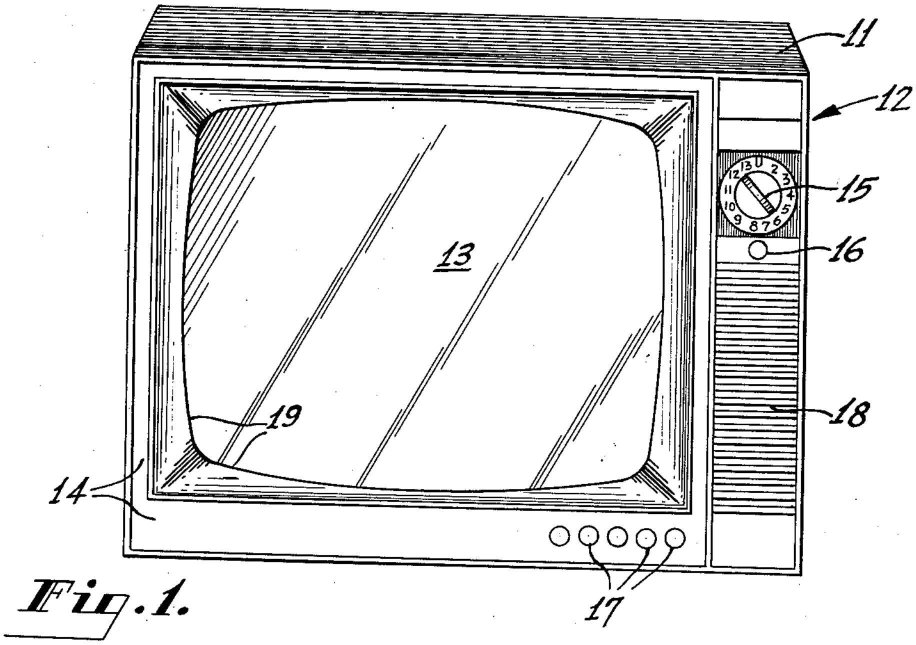
FIGURE 1 is a general front view (partially in perspective) of a television receiver cabinet in which a bi-panel kinescope is supported by a mounting in accordance with the invention.

Reference first is made to FIGURE 1. The television receiver cabinet 11 is provided with a front frame member 12 which has an opening through which the screen of the kinescope may be observed. The foremost part of the bi-panel kinescope is the filterglass cap 13 behind which is the usual phosphor screen on the inside of the faceplate of the kinescope proper. The outer generally flat portions 14 of the front member serve as mountings for such controls as the channel selector 15, the on-off switch and volume control 16, and the contrast, brightness, etc. controls 17. The loudspeaker is mounted in back of the grill 18. The inner portion of the frame 12 comprises a bezel 19 which slopes at an angle from the outer flat portions 14 toward the interior of the cabinet and terminates in contact with the cap 13 of the kinescope.

Figure 2:
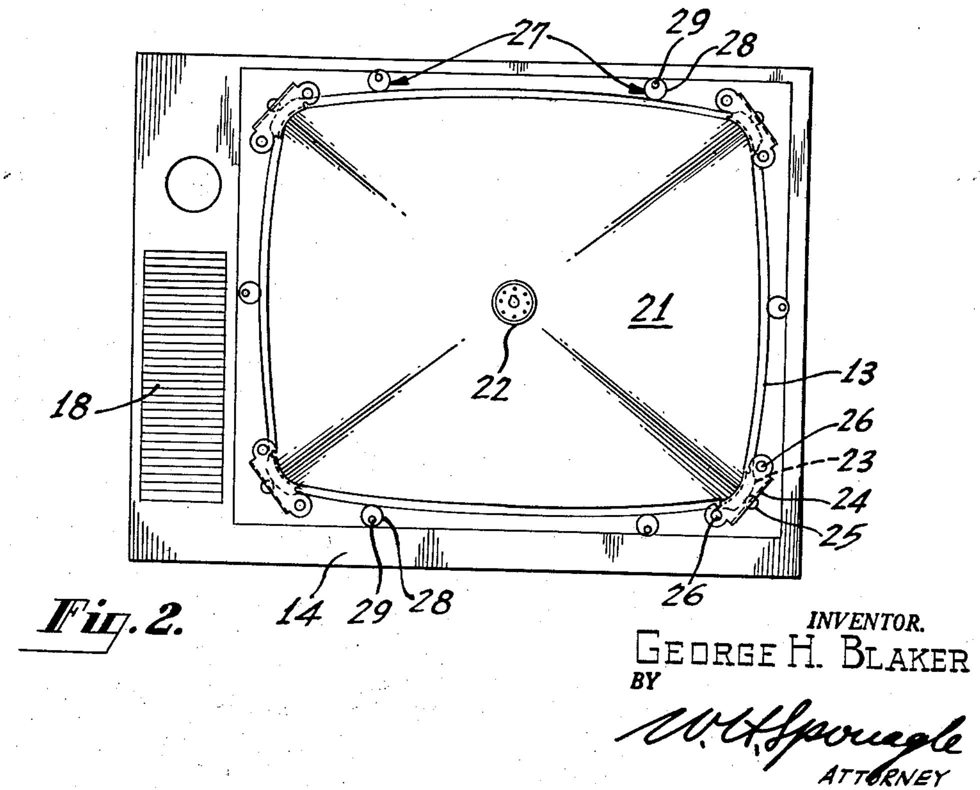
FIGURE 2 is a rear view (with back removed) of the receiver cabinet showing the general arrangement of the bi-panel kinescope mounting according to the invention.

In FIGURE 2, looking into the cabinet from the rear, is seen the bulb 21 of the kinescope and the rearwardly extending kinescope neck 22. It is to be understood that the frame 14 is attached to the cabinet in any suitable manner such as by screws into the top, bottom and end walls of the cabinet. At each corner of the kinescope, the cap 13 has lugs 23 extending therefrom. At each corner there also is provided clamping means in the form of a plate 24, the forwardly extending flanges of which respectively rest on a bearing post 25 and engage a groove formed between the kinescope and its cap (shown in detail in FIGURE 4). Each clamping plate is drawn by fastening means such as clamping screws 26 threaded into respective anchoring means (not shown in this figure) provided on the rear side of the front frame member 12. The details of one of these corner mountings will be further described in connection with FIGURES 3 and 4.

The kinescope is also properly centered in the bezel 19 (see FIGURE 1) by adjustment of a plurality of centering members 27 spaced about the periphery of the kinescope cap. Each of the centering members consists of a generally cylindrical body 28 of a resilient material such as rubber, and each is eccentrically mounted on a small shaft 29 attached to and extending rearwardly from the frame 12. The centering members 28 are adapted to be rotated by hand or suitable tool about their respective shafts so as to effect the desired centering of the kinescope viewing screen in the bezel 19 of FIGURE 1.

Figures 3, 4:
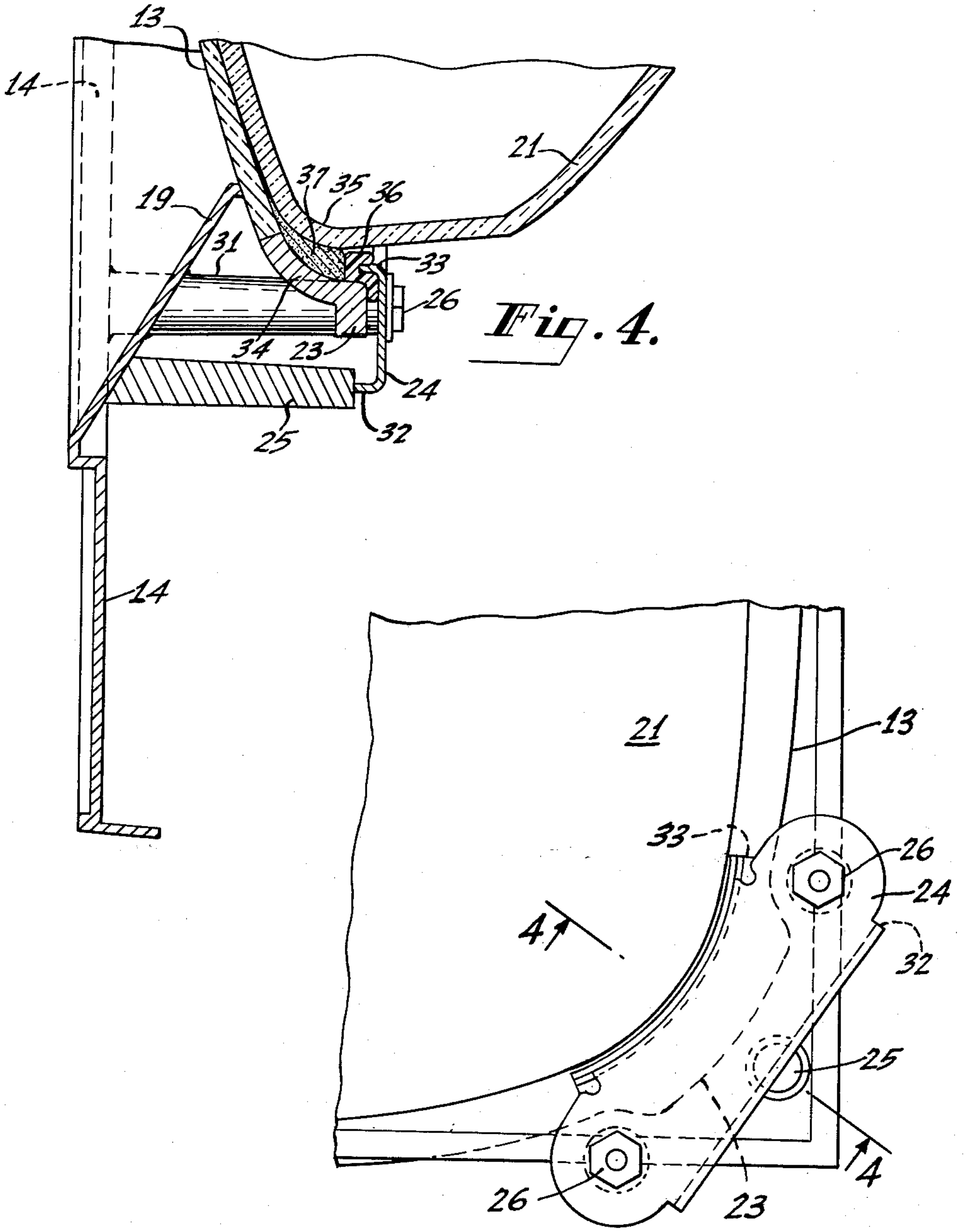
FIGURE 3 is an enlarged view from the rear of the cabinet showing one of the mounting means at one corner of the kinescope.
FIGURE 4 is a section taken on the line 4—4 of FIGURE 3 showing in greater detail one of the kinescope corner mounting means in accordance with the invention.

The details of one of the kinescope corner mounting means according to this invention may better be understood by reference to FIGURES 3 and 4. The post or stud 25 comprising a bearing means is securely attached to the bezel 19 or other part of the frame 12 in a suitable manner such as by welding. In a similar manner the anchoring means, such as posts or studs 31, are securely attached to the flat portion 14 of the frame 12. The clamping plate 24 is provided with two flanges 32 and 33. The outer flange 32 is straight and rests firmly on the end of the bearing post 25. The inner flange 33 is curved so as to extend into the groove formed between the lip 34 and the sidewall 35 of the kinescope 21. A piece of cushioning material 36 is clamped between the inner clamping plate flange 33 and the transparent cement 37 used to affix the cap 13 to the kinescope 21.

The rear or inner ends of the anchor posts 31 are tapped to receive the clamping screws 26. When these screws are tightened into the tapped ends of the anchor posts, the outer flange 32 of the clamping plate 24 is brought into unyielding engagement with the rear or inner end of the bearing post 25 and the inner flange 33 is drawn into yielding but firm engagement with the groove between the lip 34 of the cap 13 and the sidewall 35 of the kinescope 21, thereby urging the forward surface of the cap 13 into firm engagement with the inner edge of the bezel 19.

When all of the similar mounting means provided at the four corners of the kinescope, as shown in FIGURE 2, are adjusted in the manner described, a sturdy shock-proof mounting of the capped kinescope in the television receiver cabinet is achieved.

What is claimed is:

1. A mounting for supporting in a cabinet a bi-panel kinescope having a transparent cap securely affixed in intimate contact to its faceplate and terminating in a lip encompassing its sidewalls adjacent to the screen, said lip being spaced from said sidewalls so as to form a groove therebetween at least at each of the corners of said faceplate, said mounting comprising:
- a frame attached to said cabinet and having an opening for the picture-reproducing screen of said kinescope, said frame having a bezel portion extending at an angle toward the interior of said cabinet;
- bearing means attached to the rear of said frame adjacent each corner of said kinescope screen;
- anchoring means attached to the rear of said frame adjacent each corner of said kinescope screen;
- clamping means for each corner of said kinescope screen, said clamping means having a portion adapted to rest on said bearing means and having a flange extending towards said frame and being adapted to engage said corner kinescope groove;
- and fastening means engaging said clamping means and said anchoring means to urge said flange into shock-proof engagement with said kinescope groove and the exterior face of said kinescope cap into firm, relatively inflexible engagement with the inner edge of said frame bezel.

2. A mounting for supporting in a cabinet a bi-panel kinescope having a transparent cap securely affixed in intimate contact to its faceplate and terminating in a lip encompassing its sidewalls adjacent to the screen, said lip being spaced from said sidewalls so as to form a groove therebetween at least at each of the corners of said faceplate, said mounting comprising:
- a frame located adjacent to the front side of said cabinet and having an opening for the picture-reproducing screen of said kinescope, said frame having a bezel portion extending at an angle toward the interior of said cabinet;
- a bearing stud attached to the rear of said frame adjacent each corner of said kinescope screen;
- a pair of anchor studs attached to the rear of said frame adjacent each corner of said kinescope screen at opposite sides of said bearing stud, said anchor studs being adapted to receive clamping fasteners;
- a clamp for each corner of said kinescope screen, said clamp having a body portion adapted for engagement by clamping fasteners and a flange along one edge of said body portion, said clamp also having a portion adapted to rest on said bearing stud and said flange extending toward the front side of said cabinet and being adapted to engage said kinescope corner groove;
- and clamping fasteners engaging said clamp and said anchore studs, said fasteners urging said clamp flange into shock-proof engagement with said kinescope groove and the exterior face of said kinescope cap into firm, relatively inflexible engagement with the inner edge of said frame bezel.

3. A mounting for supporting in a cabinet a bi-panel kinescope having a transparent cap securely affixed in intimate contact to its faceplate and terminating in a lip encompassing its sidewalls adjacent to the screen, said lip being spaced from said sidewalls so as to form a groove therebetween at least at each of the corners of said faceplate, said mounting comprising:
- a frame forming the front side of said cabinet and having an opening for the picture-reproducing screen of said kinescope, said frame having a bezel portion extending at an angle toward the interior of said cabinet;
- a rearwardly extending bearing stud attached to said frame adjacent each corner of said kinescope screen; a pair of rearwardly extending anchor studs attached to said frame adjacent each corner of said kinescope screen at opposite sides of said bearing stud, said anchor studs being adapted to receive clamping fasteners;
- a clamping plate for each corner of said kinescope screen, said plate having a flat portion adapted for engagement by clamping fasteners and having inner and outer flanges along opposite edges of said flat portion, said outer flange being adapted to rest on said bearing stud and said inner flange being adapted to engage said kinescope corner groove;
- cushioning material in said kinescope groove;
- and clamping fasteners engaging said clamping plate and said anchor studs, said fasteners urging said clamping plate inner flange into shock-proof engagement with said kinescope groove and the exterior face of said kinescope cap into firm engagement with the inner edge of said frame bezel.

4. A mounting for supporting in a cabinet a bi-panel kinescope having a transparent cap securely affixed in intimate contact to its faceplate and terminating in a lip encompassing its sidewalls adjacent to the screen, said lip being spaced from said sidewalls so as to form a groove therebetween at least at each of the corners of said faceplate, said mounting comprising:
- a frame fastened to said cabinet adjacent its front side and having an opening corresponding generally in size and shape to the picture-reproducing screen of said kinescope, said frame having a substantially outer flat portion and an inner bezel portion extending at an angle from said outer flat portion toward the interior of said cabinet;
- a bearing post rigidly attached to said frame adjacent each corner of said kinescope screen and extending inwardly of said cabinet;
- a pair of anchor posts rigidly attached to said frame adjacent each corner of said kinescope screen and extending inwardly of said cabinet on either side of said bearing post, the inner ends of said anchor posts being tapped to receive clamping screws;
- a clamping plate for each corner of said kinescope screen, said plate having an elongated flat portion provided with screw-receiving holes adjacent its ends in alignment with the tapped inner ends of said anchor posts and having inner and outer flanges along its respective sides, said outer flange adapted to rest on the inner end of said bearing post and said said inner flange adapted to engage said kinescope corner groove;
- a cushioning strip in said kinescope groove;
- and clamping screws extending through said clamping plate holes into the tapped ends of said anchor posts, said screws moving said outer clamping plate flange into unyielding contact with the inner end of said bearing post and forcing said inner clamping plate flange into yielding but firm engagement with said kinescope corner groove so as to bring the exterior face of said kinescope cap into firm engagement with the inner edge of said frame bezel.

5. A mounting for supporting in a cabinet a bi-panel kinescope having a transparent cap securely affixed in intimate contact to its faceplate and terminating in a lip encompassing its sidewalls adjacent to the screen, said lip being spaced from said sidewalls so as to form a groove therebetween at least at each of the corners of said faceplate and having outwardly extending lugs at said corners, said mounting comprising:
- a generally rectangular frame fastened to said cabinet adjacent its front side and having an opening corresponding generally in size and shape to the picture-reproducing screen of said kinescope, said frame having a substantially outer flat portion and an inner bezel portion extending at an angle from said outer flat portion toward the interior of said cabinet;

a bearing post rigidly attached to said frame adjacent each corner of said kinescope screen and extending inwardly of said cabinet to a point opposite the approximate middle of the corner lug of said cap;

a pair of anchor posts rigidly attached to said frame adjacent each corner of said kinescope screen and extending inwardly of said cabinet to points respectively opposite the ends of the corner lug of said cap, the inner ends of said anchor posts being tapped to receive clamping screws;

a clamping plate for each corner of said kinescope screen, said plate having an elongated flat portion provided with screw-receiving holes adjacent its ends in alignment with the tapped inner ends of said anchor posts and having flanges along its sides, one of said flanges being substantially straight and resting on the inner end of said bearing post and the other of said flanges being curved in substantial alignment with said kinescope corner groove;

a cushioning strip of resilient material between said kinescope groove and the curved flange of said clamping plate;

and clamping screws extending through said clamping plate holes into the tapped ends of said anchor posts, said screws moving said straight clamping plate flange into unyielding contact with the inner end of said bearing post and forcing said curved clamping plate flange into shock-proof engagement with said kinescope corner groove so as to bring the exterior face of said kinescope cap into firm engagement with the inner edge of said frame bezel.

6. A mounting for supporting in a cabinet a bi-panel kinescope having a transparent cap securely affixed in intimate contact to its faceplate and terminating in a lip encompassing it sidewalls adjacent to the screen, said lip being spaced from said sidewalls so as to form a groove therebetween at least at each of the corners of said faceplate and having outwardly extending lugs at said corners, said mounting comprising:

a generally rectangular frame fastened to said cabinet so as to form its front side and having an opening corresponding generally in size and shape to the picture-reproducing screen of said kinescope, said frame having a substantially outer flat portion and an inner bezel portion extending at an angle from said outer flat portion toward the interior of said cabinet;

a bearing post rigidly attached to the bezel portion of said frame adjacent each corner of said kinescope screen and extending inwardly of said cabinet to a point opposite the approximate middle of the corner lug of said cap;

a pair of anchor posts rigidly attached to the flat portion of said frame adjacent each corner of said kinescope screen and extending inwardly of said cabinet to points respectively opposite the ends of the corner lug of said cap, the inner ends of said anchor posts being tapped to receive clamping screws;

a clamping plate for each corner of said kinescope screen, said plate having an elongated flat portion provided with screw-receiving holes adjacent its ends in alignment with the tapped inner ends of said anchor posts and having flanges along its sides, one of said flanges being substantially straight and resting on the inner end of said bearing post and the other of said flanges being curved in substantial alignment with said kinescope corner groove;

a cushioning strip of resilient material betweeen said kinescope groove and the curved flange of said clamping plate;

clamping screws extending through said clamping plate holes into the tapped ends of said anchor posts, said screws moving said straight clamping plate flange into unyielding contact with the inner end of said bearing post and forcing said curved clamping plate flange and said cushioning strip into shock-proof engagement with said kinescope corner groove so as to bring the exterior face of said kinescope cap into firm engagement with the inner edge of said frame bezel;

and a plurality of centering members attached to said frame at spaced points about the periphery of said kinescope for eccentric rotary movement so as to bear on said kinescope sidewalls and center said kinescope viewing screen in said frame bezel.

References Cited in the file of this patent

FOREIGN PATENTS 1,091,152 Germany ------------- Oct. 20, 1960